July 26, 1932.  F. L. BORCHERT  1,869,090
CUTTING AND COATING MACHINE
Filed May 10, 1930  5 Sheets-Sheet 1

July 26, 1932.  F. L. BORCHERT  1,869,090
CUTTING AND COATING MACHINE
Filed May 10, 1930   5 Sheets-Sheet 5

Patented July 26, 1932

1,869,090

UNITED STATES PATENT OFFICE

FRED L. BORCHERT, OF ROCKFORD, ILLINOIS

CUTTING AND COATING MACHINE

Application filed May 10, 1930. Serial No. 451,261.

My invention relates to cutting and coating machines and has special reference to machines adapted for use in cutting ice cream into bars of suitable size and coating them with chocolate or the like.

An object of the invention is to provide a rapid and efficient machine for cutting and coating ice cream at a relatively low cost.

Another object of the invention is to provide a machine which may be partially collapsed when not in use whereby the storage space required therefor is substantially reduced.

I have also aimed to provide a machine of this character wherein the parts which have a tendency to become soiled during the operation of the machine, may be easily removed from the framework thereof for cleaning, washing or sterilizing.

A further object of the invention is to provide a machine in which the coating material is maintained at a uniform level in the coating chamber and is automatically added thereto at approximately the rate at which it is consumed.

A still further object of the invention is to provide an improved reservoir and valve therefor adapted to be readily removable from the machine and to regulate the addition of coating material to the coating chamber.

Another object of the invention is to provide a machine of this character in which the work holders, actuating mechanism and timing mechanism are arranged about a single shaft adapted to be rotated by a suitable source of power.

Other objects and attendant advantages will be apparent to those skilled in the art from the following description and the accompanying drawings in which—

Figure 1 is an elevation of my improved cutting and coating machine;

The present invention is an improvement on the confection making machine covered by my Patent No. 1,687,707, granted October 16, 1928. My present machine is similar to my prior machine insofar as general functions are concerned, except that no wrapping mechanism is shown, although it may be supplied as optional equipment. The present machine, as in the prior case, employs a series of work holders each equipped with means for impaling a block of ice cream, mechanism for cutting individual blocks from the end of a slab or brick of ice cream, means for causing the work holders to successively impale a block and carry it to a coating position or station, means for causing the blocks to be coated at such station, and means for causing the coated blocks to be carried by the work holders from the coating position to a discharging position during which interval the coating hardens. In my prior machine the mechanism for operating the various parts in timed relation was so constructed and organized that the machine was rather bulky and costly to manufacture. In the present invention I have provided a simple and novel operating mechanism in which the operating parts are coordinated with the operated parts or devices in a particularly advantageous manner inducive to simplicity in construction, compactness, and economy in cost of manufacture. These results are obtained preferably by the provision of a main drive shaft arranged in close and direct driving relation to the rotary head carrying the work holders as, for example, in coaxial relation thereto, and in the provision of cams arranged on said main cam shaft to be driven thereby, and in the further provision of connections between these cams and the several devices to be operated, the whole being so organized and coordinated as to produce the automatic cycle of operations desired.

Figure 2:
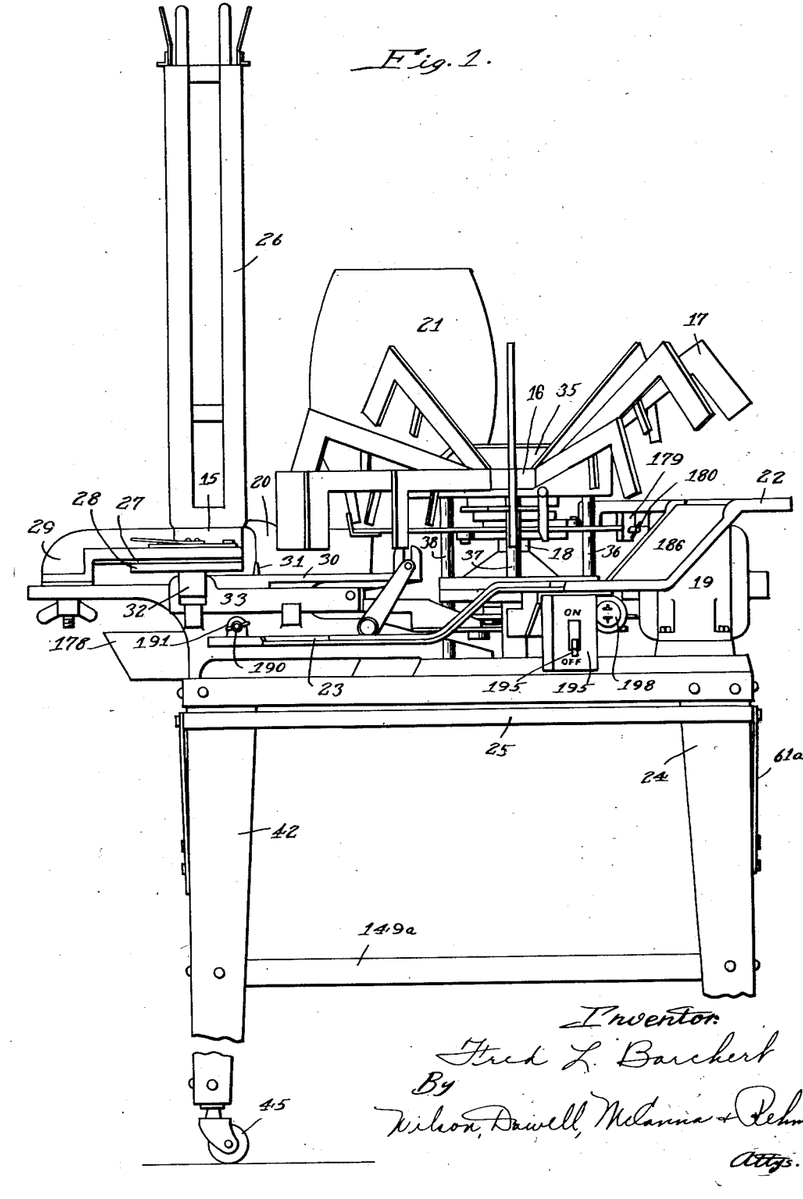
Fig. 2 is a top view of the machine.

Referring to the drawings and more particularly to Figs. 1 and 2 the machine includes a cutting and feeding mechanism designated generally by 15, a rotary work head 16 carrying radially spaced work holders indicated generally by 17, a rotatable driving shaft 18, having actuating and timing mechanism presently to be described arranged thereon, a motor 19 adapted to drive said shaft, a coating tank 20 for holding the heated coating material into which the blocks are to be dipped, a reservoir 21 for supplying coating material to the tank 20, trays 22 and 23 for catching the drip from the block while being transported and for receiving the finished bar at the discharge station, and a table 24 having a rotatable shelf 25, the table being adapted to support the mechanism and the shelf to provide working space for wrapping operations.

The cutting and feeding mechanism 15 is substantially similar to that shown in my prior Patent No. 1,687,708, granted October 16, 1928, though any desired or suitable mechanism may be employed for this purpose. The mechanism shown includes a hopper, designated generally by 26, into which suitably sized and shaped blocks of ice cream are adapted to be positioned, horizontal cutters 27, a cutter slide 28 adapted to operate the cutters, and a bracket 29 arranged to support the cutters and cutter slide. A carrier 30 having an upstanding projection 31 is arranged to be reciprocated forward and backward beneath the cutters 27, in timed relation, to carry successive blocks of ice cream from beneath the cutters as they are cut from the brick. A projection 32 from the cutter slide 28 engages a reciprocable slide bar 33 of the operating mechanism, by which the cutter slide 28 is reciprocated, bringing about cutting motion of the cutter blades. The carrier 30 and the slide bar 33 are actuated in timed relation by a mechanism presently to be described. Such movement causes the cutter 27 to sever a block of ice cream from the bottom of the brick contained in the hopper 26. This block rests upon the carrier 30 in front of the upstanding projection 31. The carrier 30 is then moved outward to a work receiving position at which point the block is removed from the carrier by mechanism presently to be described. The carrier 30 is then moved back to a position beneath the cutters 27 where a second block of ice cream is severed from the brick in the manner just described. These operations are carried out in a continuous manner, as clearly disclosed in my aforementioned patent.

Figure 3:
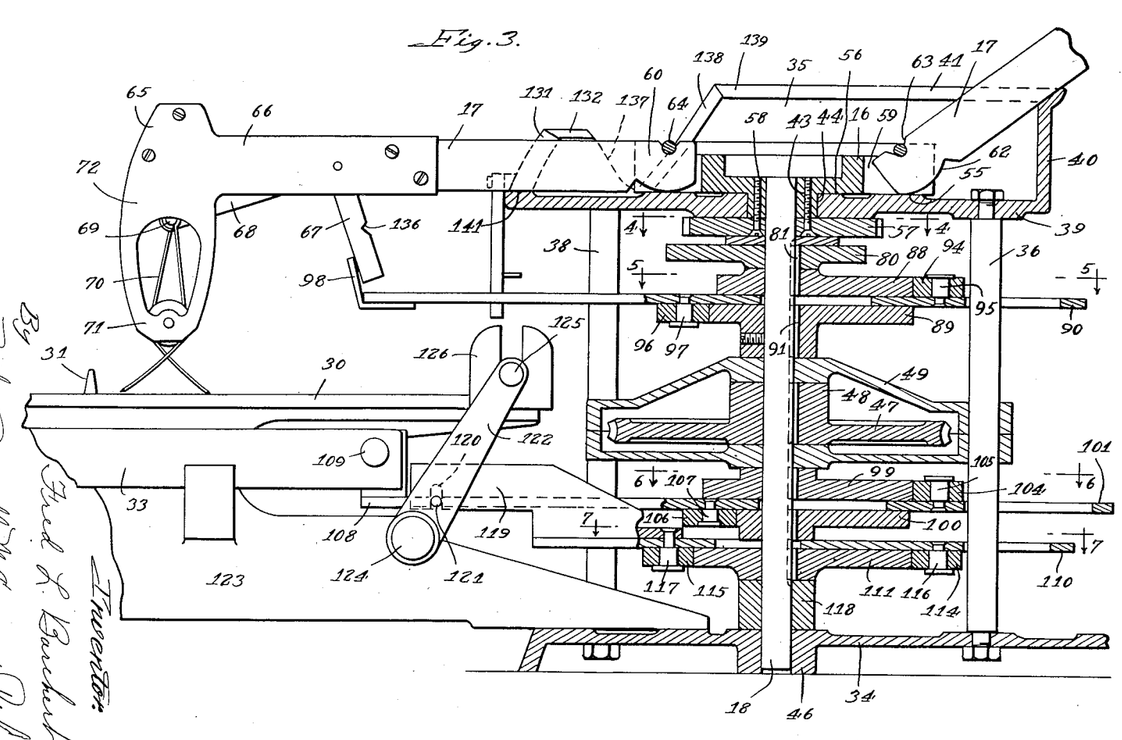
Fig. 3 is a vertical section along the shaft showing a work holder, and the actuating and timing cams.

Referring now to Fig. 3 wherein the transporting and actuating mechanism is shown, the numeral 34 indicates generally a base upon which a cam casting 35 is supported through spacing rods 36, 37, and 38. These spacing rods serve to secure the cam casting 35 securely to the base 34 and to space the former from the latter to permit operating mechanism to be interposed therebetween. These rods also serve as guiding means for the cam slides presently to be described.

Figure 9:
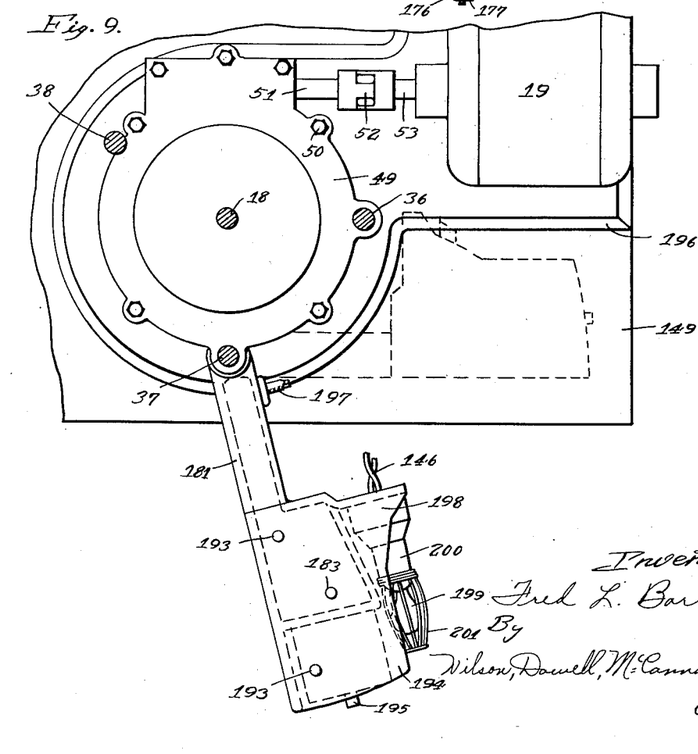
Fig. 9 is a horizontal section taken just above the worm gear housing, showing the rotatable switch bracket.

The cam casting 35 has a substantially circular bottom portion 39 and a marginal upstanding edge 40, the upper surface of which provides cam surfaces, indicated collectively by 41. A work head 16 presently to be described is axially positioned on the upper surface of the circular bottom portion 39 and has a downwardly depending sleeve 43 extending through an axial opening 44 in the portion 39. A vertical shaft 18 extends between the frame 34 and the cam casting 35, the upper end thereof being rotatably positioned within the sleeve 43 and the lower end thereof being rotatably positioned in a bearing 46 of the frame 34. A worm gear 47 is fixedly attached to the shaft 18 by means of a key 48, the worm gear 47 being arranged to rotate the shaft and being itself driven by means of a conventional worm not shown. A housing 49 secured to the rods 36, 37, and 38 serves to enclose the gear 47 and the worm to permit suitable lubrication thereof. Bolts 50 act to hold the two sections of the housing 49 firmly together. The worm is driven through a worm shaft 51 attached, through a resilient connection 52, to the shaft 53 of a suitable motor 19, as shown in Fig. 9.

Referring to the working head 16, the portion 39 is provided with bearing surfaces 55 and 56 on its upper surface against which the head may rest in its rotary motion upon the portion 39. A ratchet wheel 57 is secured against the lower end of the sleeve 43 by means of screws or bolts 58 and bears against the lower side of the portion 39. An intermittent rotary motion is transmitted to the head 16 through the ratchet 57 in a manner presently to be described. The head is provided with radially positioned slots 59, in this instance 12 in number, adapted to receive the inner ends 60 of the work holders designated generally by 17. One edge of each work holder is provided with a cam surface 62 at its end, the opposite edge thereof being provided with a notch 63. A circular wire ring 64 is positioned on the top of the work head 16 across the spaced slots 59, so as to engage the notches 63. This arrangement permits the work holders 17 to have radial movement about their inner ends while being held securely in place between the bearing surface 55 of the portion 39 and the ring 64. The arrangement also permits the work holders 17 to be completely removed from the head 16 by raising them to a vertical position. In this position the work holders may be drawn radially from the slots 59 disengaging the ring 64 from the notches 63. The work holders 17 are arranged to project radially outward from the head 16 and bear against the cam surface 41 intermediate their ends, whereby the outer ends 65 thereof may be raised and lowered in conformity with the shape of the cam surface 41, as the head 16 is rotated.

While the work holders 61 may be of any desired or suitable construction I have herein shown work holders substantially similar to those shown in my copending application, Serial No. 340,756, filed February 18, 1929, wherein the outer end thereof is provided with spaced side pieces 66 between which is interposed a bell crank lever having a downwardly projecting leg 67 and a horizontally disposed leg 68, the outer end of the leg 68 being provided with devices 69 for supporting impaling elements 70. The impaling elements 70 are adapted to be projected from the lower end 71 of a head 72 when the leg 67 is drawn toward the right facing Fig. 3, and be withdrawn into the head 72 when the leg 67 is moved to the left facing this figure as clearly set forth in the above-mentioned application.

Figure 4:
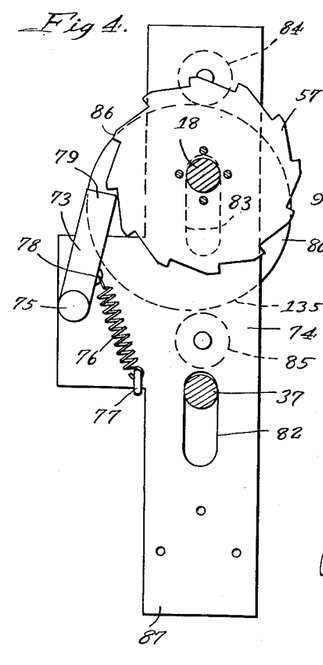
Figs. 4, 5, 6 and 7 are top views of the cams taken on the lines 4—4, 5—5, 6—6 and 7—7, respectively, of Fig. 3.

Intermittent rotary motion is transmitted to the head 16, and consequently to the work holders 17 through a ratchet mechanism shown in Fig. 4. A pawl 73 is pivotally attached to a cam slide 74 through a screw 75 positioned therein. A spring 76 attached to the cam slide at 77 and to the pawl at 78 serves to maintain the free end 79 of the pawl firmly against the ratchet wheel 57 at all times. The cam slide 74 is slidably supported between the ratchet wheel 57 and a cam 80, fixedly positioned upon the shaft 18 by means of a key 81, the spacing rod 37 and the shaft 18 passing through slots 82 and 83 in the cam slide to prevent lateral movement of the slide. The cam 80 may suitably be a circular cam eccentrically positioned upon the shaft 18 and is arranged to cause the cam slide 74 to reciprocate backward and forward through contact with cam followers 84 and 85 rotatably positioned on the lower side of the cam slide 74 in contact with the cam 80. When the cam slide 74 is moved upward facing Fig. 4, the free end 79 of the pawl 73 will engage one of the teeth 86 of the ratchet wheel 57 causing the rotation of the latter through a certain predetermined degree of angularity, thus bringing the work holders 17 into the positions shown in Fig. 2. The opposite movement of the cam slide 74 serves to bring the outer end 87 thereof in contact with the leg 67 of the impaling mechanism, in a work holder opposite thereof, causing it to be moved to the left thus retracting the impaling elements 74.

Figure 5:
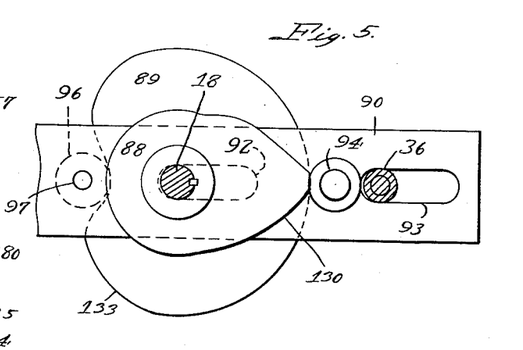
Figure 6:
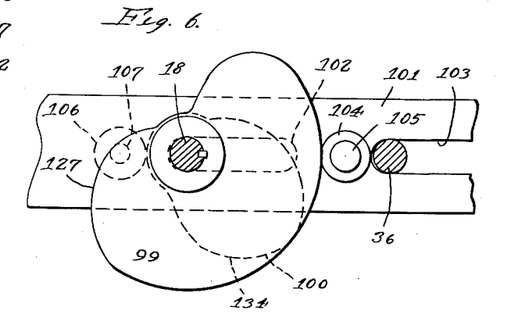

Arranged below the cam 80 and above the worm gear housing 49 are two cams 88 and 89 mounted upon the shaft 18 and shown more in detail in Fig. 5. A cam slide 90 is positioned between these two cams which are fixedly attached to the shaft 18 through the keys 81 and 91. Slots 92 and 93 are provided in the cam slide 90 for the slidable reception of the shaft 18 and the spacing rod 36 which serve to guide the cam slide 90. A cam follower 94 is rotatably attached to the upper side of the cam slide 90 through a bearing pin 95 secured in the cam slide and is positioned to be actuated by the cam 88. A second cam follower 96 is secured to the lower side of the cam slide 90 through a bearing pin 97 and is adapted to be actuated by the cam 89. Rotation of the shaft 18 in a clockwise direction will cause the cams 88 and 89 to reciprocate the cam slide 90 from left to right facing Fig. 3 in timed relation with the remainder of the mechanism. An upwardly projecting finger 98 is provided at the outer end of the cam slide 90 and serves to draw the leg 67 of the impaling mechanism, in the work holder over the carrier 30, to the right facing this figure whereby the impaling elements 70 are projected outward from the head 72 and into the positioned block of ice cream. This movement occurs while the work holders 17 are stationary, that is, between the intermittent movements imparted to the work head 16. The outer end of the cam slide 90 is arranged to project over the carrier 30 and to actuate the impaling elements when one of the work holders is positioned over the block of ice cream resting upon the carrier 30, only a single work holder being actuated by the sleeve 90 at one time. Cams 99 and 100 are positioned on the shaft 45 below the worm gear casing 49 and have a cam slide 101 slidably held therebetween as shown in Fig. 6. This cam slide is also provided with slots 102 and 103 through which the shaft 18 and the spacing rod 36 pass to secure the cam slide from lateral movement. The cam slide 101 is provided on its upper surface with a cam follower 104 secured to the slide by bearing pin 105, and cam follower 106 secured to the lower side of the slide through the bearing pin 107. Rotation of the shaft 18 causes the slide 101 to be moved to the right viewing Fig. 3 in conformity with the cam 99 and to the left in conformity with the cam 100. The outer end 108 of the cam slide 101 is pivotally secured to the cutter bar 33 by means of a pin 109, the slide 101 serving to actuate the cutting mechanism in timed relation with the remainder of the mechanism actuated from the shaft 18, the surfaces of the cams 99 and 100 being formed to cause suitable movements thereof.

Figure 7:
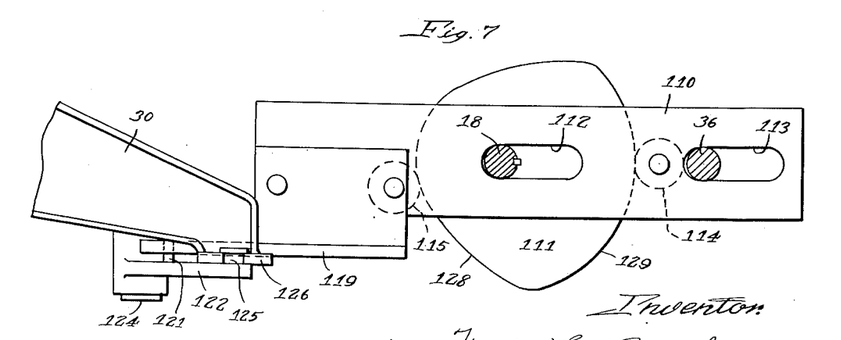

A cam slide 110 is supported beneath the cam 100 by a cam 111. The cam slide 110, shown in detail in Fig. 7, is provided with slots 112 and 113 through which the shaft 18 and the spacing rod 36 pass to prevent the slide from lateral movement. Cam followers 114 and 115 are secured to the lower side of the cam slide 110 by bearing pins 116 and 117 arranged to be actuated from the surface of the cam 111. The cam 111 is spaced from the frame 34 by means of a spacing block 118 which serves to support the cam 111, which is fixedly secured to the shaft 18. Rotation of the shaft 18 will cause the cam 111 to reciprocate the cam slide 110. The outer end of the cam slide 110 is provided with a finger 119 having an upwardly extending notch 120 adapted to engage a pin 121 in a lever 122. The lever 122 is pivotally secured to an extension 123 of the frame 34 through a pin 124, the lever 122 being arranged to move about the pivotal pin 124 with the reciprocating movement of the slide 110. The upper end of the lever 122 is provided with a bearing pin 125 engaging the opening of a U-shaped bracket 126 on the outer end of the carrier 30. Through these elements the reciprocation of the cam slide 110 causes the reciprocation of the carrier 30 in timed relation with the remainder of the mechanism.

Following now the sequence of operation of my improved machine, rotation of the shaft 18 causes the cam 99 to be brought in contact with the cam follower 104 along the area 127 drawing the cutter bar 33 outward and cutting off a block of ice cream from the lower end of a brick in the hopper 26. Further rotation of the shaft 18 brings the cam 111 in contact with the cam follower 114 along the area 128, thus causing the carrier 30 to be drawn to the right, viewing Fig. 3, and with it the block of ice cream. The carrier 30 is held stationary in the position shown in Fig. 3 while the cam follower 114 is in contact with the portion 129 of the cam 111. During this period contact of the cam 80 with the follower 85 causes the impaling elements of the work holder opposite the end 87 of the slide 74 to be retracted and contact of the cam 80 with the follower 84 causes rotation of the head 16 bringing one of the work holders 17 over the block of ice cream, as shown in Fig. 3. Continued rotation of the shaft causes contact of the cam 88 in the area 130, against the cam follower 94, moving the cam slide 90 to the right, and causing the impaling elements 70 to be projected from the head 72 and into the block of ice cream positioned upon the carrier 30.

The next successive movement of the head 16 causes the work holder 17 which has just finished the impaling operation to move upward along the cam surface 131, thereby lifting the block of ice cream from the carrier 30. At the close of this intermittent movement of the head 16 the work holder 17 will rest upon the upper cam surface 132, holding the block of ice cream suspended, and a second work holder will have been moved into position over the carrier 30.

While the work holder 17 is being moved from the position shown in Fig. 3 to a position upon the cam surface 132 the surface 133 of the cam 89 is brought into contact with the cam follower 96, causing the cam slide 90 to be moved toward the left, viewing Fig. 3, to position the finger 98 for the next succeeding impaling operation. At the same time the cam face 134 of the cam 100 is brought into contact, by the rotation of the shaft 18, with the cam follower 106 causing the cutter bar 33 to be moved toward the left, viewing Fig. 3, thereby opening the cutters 27 preparatory to the next cutting operation. In like manner the cam surface 128 of the cam 129 is brought into contact with the cam follower 115 whereby the carrier 30 is moved back into position beneath the cutter 27. These operations are carried out through one complete rotation of the shaft 18. On the next rotation of the shaft 18 a similar set of operations will be carried out. Each rotation of the shaft 18 causes the head 16 to be moved through a certain degree of angularity by contact of the pawl 73 with successive teeth 83 of the ratchet gear 57.

During each rotation of the shaft one of the work holders 17 will be stopped opposite the outer end 87 of the cam slide 74. At this point contact of the cam surface 135 with the cam follower 85 will cause the end of the cam slide 74 to be brought into the notch 136 on the leg 67 of the impaling mechanism, forcing the leg 67 to the left, viewing Fig. 3, and retracting the impaling elements 70 from the block of ice cream held thereon.

The second intermittent movement of the head 16, after the impaling operation has taken place, causes the work holder 17 to move down the cam surface 137 whereby the block of ice cream held by the impaling elements 70 is submerged in a bath of liquid coating material held in the coating tank 20. The next succeeding intermittent movement of the head 16 causes the work holder to move up the cam surface 138 onto the substantially level cam surface 139. Successive intermittent movements of the head 16 brings the work holder 17 along the cam surface 139 to an inclined cam surface 140 in Fig. 2 where the work holder moves downward to the cam surface 141 to the point opposite the outer end 87 of the cam slide 74, where the impaling elements are retracted. Continued intermittent movement brings the work holders 17 successively into the position shown in Fig. 3. While the work holders are in contact with the cam surface 139 the coated block of ice cream is held suspended as shown in Fig. 1, giving ample time for the coating material to chill and solidify on the surface of the block of ice cream before it is deposited.

Figures 8, 10:
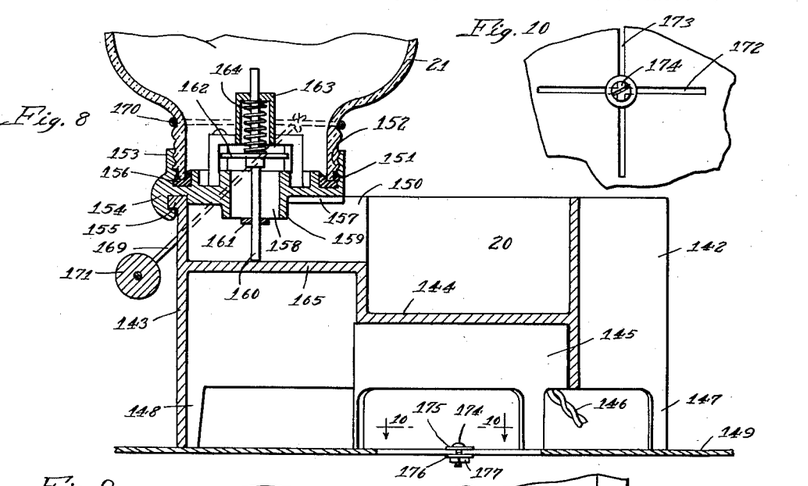
Fig. 8 is a vertical section through the valve, coating tank, and table top showing my improved construction.
Fig. 10 is a section on the line 10—10 of Fig. 8 showing the table top construction.

The coating material, which will usually be a chocolate composition, is held in a coating tank 20, shown in cross-section in Fig. 8, which is formed in a shape to correspond to the arc of the circle in which the impaling heads 72 move during the rotation of the head 16, the shape of the tank being shown in Fig. 2. The tank may be advantageously cast integrally and provided with inner side wall 142, outer side wall 143 and ends 143a and 143b. A lip 142a may advantageously be provided at one corner of the tank 20 to aid in pouring the material from the tank should this be desired. The bottom 144 of the tank is spaced from the lower end of the walls 142 and 143 to decrease the amount of coating material required to bring the level thereof to a sufficient height to permit the work holders 17 to dip the block of ice cream into the material. The material commonly to be employed in this tank is such as to be solid at normal temperatures and liquid at temperatures slightly above normal. In order, therefore, to maintain the coating material in a liquid state an electric heater 145 of suitable shape and design is positioned beneath the bottom 144 of the tank 20 as shown in Fig. 8. Electrical conduits 146 connect the heater, through a switching arrangement, presently to be described, to a suitable source of electrical energy. Legs 147 and 148 serve to support the tank 20 upon the top 149 of the table 24 and separate the bottom edge of the walls 142 and 143 therefrom. This tank, while being of general arcuate shape, is provided with an offset portion 150 adapted to support a coating reservoir 21 and a valve, indicated generally by 151, screwed onto the threaded neck 152 through an internally threaded sleeve 153. A rubber gasket 156 serves to seal the joint between the neck 152 of the reservoir and the valve 151. The valve is provided with a downwardly extending hook 154 adapted to engage a projection 155 at the upper edge of the wall 143 The lower side of the valve opposite the hook 154 is provided with downwardly projecting ribs 157 which bear against the side walls of the offset portion 150 of the tank 20 to prevent lateral movement of the valve 151 with respect to the tank 20. The reservoir 21 with the valve attached is removable from the tank 20 by tipping the reservoir to the left, facing Fig. 8, and sliding it sidewise. In this manner the right side of the valve 151 is disengaged from the side walls and the hook 154 is disengaged from the projection 155 so that the reservoir and valve may be lifted from the tank.

The center of the valve 15 is provided with an opening 158 having downwardly projecting side walls 159. A valve stem 160 is axially positioned therein and passes through a strip 161, positioned against the opening, which serves as a guide for the stem. A valve disc 162 is positioned intermediate the ends of the stem 160 and is adapted to set against the upper edge of the side wall 159 to prevent the egress of fluid from the reservoir 21. A valve guide 163 within the reservoir serves to guide the upper end of the valve stem 160 and a spring 164 serves to urge the valve disc 162 against the side wall 159. The stem 160 is made of such length as to have the lower end thereof bear against the bottom of the offset portion—when the valve is positioned thereon, thus forcing the valve stem up and urging the valve disc 162 to an open position against the pressure of the spring 164. The bottom 165 of the offset portion may be raised somewhat, as shown, to decrease the length of the stem 160. Thus, when the reservoir 21 is positioned over the tank 20 the valve will always be in its open position. However, when the reservoir 21 is removed from the tank 20 the spring 164 immediately moves the disc 162 to its closed position, since the end of the valve stem 160 is removed from contact with the bottom under these circumstances. The reservoir 21 may thus be removed from the tank 20 without danger of spilling the contents. A bail 169 is attached to the neck 152 of the reservoir 21 by means of a wire 170 passing around the neck and is provided with a handle 171 for carrying or otherwise handling the reservoir 21.

When the filled reservoir is placed upon the tank, coating material will flow out until the level thereof in the tank 20 reaches the lower edge of the side wall 159 at which time the flow thereof from the reservoir will stop. The valve remaining open, further coating material will flow from the reservoir wherever the level of material in the tank 20 drops to any appreciable extent and permits air to enter the container. While the coating material is normally solid, sufficient heat is radiated from the tank 20 to maintain the material in the reservoir in a liquid or semiliquid condition during the operation of the machine. At other times it may be necessary to immerse the reservoir in warm water to soften the contents.

A tray 178 is provided to rest upon the table top 149 between the end 143b of the tank 20 and the frame extension 123, one edge of the tray resting beneath the carrier 30 so that the ice cream which may melt on the surface thereof may drip from the carrier into the tray and be held therein to be later suitably discharged. The tray 178 also serves to catch the drip from the block of ice cream while it is being transported, on the impaling elements 70, between the carrier 30 and the tank 20.

The semi-circular tray 22 is of such shape as to rest beneath the outer end 65 of the work holders 17 while the latter are rotated from the tank 20 to the discharging point opposite the end 87 of the cam slide 74. This tray may be suitably secured to the end 143a of the tank 20 as by means of a downwardly projecting finger 179 and a set screw 180 therein adapted to engage the outer surface of the end 143a. The opposite end of the tray 22 is supported upon a switch bracket, indicated generally by the numeral 181, presently to be described more in detail. A downwardly projecting pin 182 on the bottom side of the tray 22 rests in a socket 183 in the switch bracket 181 and serves to maintain the end of the tray in a fixed position with respect to the bracket. The tray 22 has a portion 184 at an upper level and a portion 185 at a lower level connected by an inclined portion 186. This arrangement permits the tray to pass over the motor 19 to protect the latter from drippage from the suspended block of ice cream and permits the work holders 17 to move downward along the cam portion 140 without the block of ice cream coming in contact with the tray. However, the portion 185 is at such a level as to permit contact of the end of the tray 22 with the top of the switch bracket 181.

The tray 23 is arranged to extend beneath the outer ends 65 of the work holders 17 from the bracket 181 to the frame extension 123. This tray is arranged in two levels, the portion 187 lying in substantially the same horizontal plane as the portion 185 of the tray 22. An inclined portion 188 connects the portion 187 with a portion 189 in a lower plane, the portion 189 extending to the frame extension 123, being attached thereto by a projection 190 and a wing nut and bolt 191. The portion 187 rests upon the switch bracket 181 and is secured thereto by means of downwardly projecting pins 192 extending into the openings 193 of the switch bracket 181. The portion 187 serves as the point at which the coated blocks are discharged, the impaling elements being retracted by the cam slide 74, as already described. The portion 189 of the tray 23 serves as a storage space for the discharged blocks, succesive blocks being pushed from the portion 187 down the inclined portion 188 when the next succeeding bar is brought to the discharge position by movement of the work holders 17. Thus, a number of finished blocks may be deposited upon the storage space 189 before it becomes necessary to remove them. In this manner the operator, who will normally be carrying out the wrapping operations on the shelf 25, will not be required to remove the finished bars from either the portion 187 or the portion 189 as soon as they are discharged thereon, but may permit a number of articles to accumulate thereon.

The switch bracket 181 serves a three-fold purpose. The bracket is pivotally connected at its inner end to swing about the spacing rod 37 from the full line position, shown in Fig. 9, to the dotted line shown therein. A switch 194 having a lever 195 for the operation thereof is positioned at the outer end of the switch bracket 181. This switch is connected to the motor 54 by means of an electrical conduit 196 through which power is supplied to the motor. Movement of the lever 195 serves to complete the electrical circuit to the motor or to open the circuit as desired. A second electrical conduit 197 is adapted to be connected to a suitable source of electrical energy. A second switch 198 in the form of a lamp socket is suitably connected to the side of the switch bracket 181, as shown in Figs. 1 and 9, and has the electrical conductors 146 from the heater 145 connected thereto. This switch serves to turn the heater 145 off or on as desired. In order to indicate whether or not the heater 145 is on, a small lamp bulb 199, positioned in a plug 200 and having a suitable guard 201, is employed for closing the circuit through the switch 198. Thus, when electrical energy is passing through the heater 145 the plug 200 will be inserted in the switch 198 and the lamp 199 will be on. To shut off the heater the plug 200 is withdrawn from the switch 198. The pivotal mounting of the switch bracket 181 permits the latter to be swung to the dotted line position shown in Fig. 9 when the trays 22 and 23 are removed therefrom. Under these circumstances the shelf 25 may be lowered to a vertical position alongside the table 24, and those of the work holders 17 which may project beyond the edge of the table 24 may be removed, whereby the amount of floor space required for the machine is substantially reduced.

Referring now to Figs. 1, 8 and 10, the table 24 is provided with a top 149 and suitable legs 42 having casters 45 at the bottom thereof to permit the mechanism to be moved from place to place, means are shown for preventing the warping of the metal table top 149 due to the expansion thereof from local heating under the heater 145. Unless some means are provided for taking up the expansion of the metal in the table top 149 under the heater 145 the metal thereof may buckle and twist so badly as to disturb the level of the tank 20. I have, therefore, provided cross-slits 172 and 173 in the table top 149 directly beneath the heater 145, as shown in Fig. 8. At the intersection of the slits a bolt 174 is positioned, having washers 175 and 176 near either end thereof bearing against opposite sides of the top 149. A nut 177 permits the washers 175 and 176 to be drawn tightly together. By this arrangement the rigidity of the top 149 is not substantially impaired but space is provided by the slits 172 and 173 for the expansion of the metal when heated. The shelf 25 is supported from the legs 42 at a slightly lower level than the top 149 through pivotal connection 61. Braces 61a serve to lend rigidity to the shelf. An intermediate platform 149a may be positioned between the legs 42, if desired, to serve as a depository for the disassembled parts of the machine.

It will be seen that the machine just described and herewith illustrated embodies substantial economies in production and operation over those of the prior art. The various units of the assembly are directly actuated from a single shaft 45 through the cams positioned thereon. Such an arrangement completely precludes the possibility of any portion of the mechanism getting out of time. The operation is direct and highly positive.

The construction is such as to permit all of the parts, which in any way come in contact with the material being handled to be easily and readily removed from the remainder of the structure for cleansing and sterilization.

The machine may be partially dismantled with great facility to permit of material reduction in the amount of floor space required for the storage of the machine.

Positive and automatic means are provided for maintaining the level of the coating material in the coating tank 20 at a uniform level. This relieves the operator from being constantly attentive to the amount of material in this tank. Furthermore, most of the coating material may be held in the reservoir 21 which may be removed from the tank 20 without difficulty and stored for a subsequent operation.

Means are provided for receiving the slop caused by the melting of the ice cream during the cutting operations and for receiving the drip from the coated block while the coating material is being congealed, thus increasing the cleanliness of the operation and saving a substantial amount of coating material which would otherwise be distributed over the top of the table and surrounding parts.

While I have thus described and illustrated a specific embodiment of my invention I am aware that numerous changes and alterations may be made therein without materially departing from the scope of the invention and I do not wish to be limited except as required by the prior art and the appended claims, in which—

I claim:

1. The combination, in a driving mechanism for cutting and coating machines, of cutting mechanism arranged to cut and feed a block of ice cream, work holders each equipped with impaling elements adapted to impale a block, the work holders being arranged to successively move said blocks from a loading position to a coating position and thence to a discharging position, means for coating each block at said coating position, a continuously driven shaft, means including a cam on said shaft for moving the work holders from position to position, a cam on said shaft adapted to actuate said cutting mechanism, and a cam on said shaft for effecting the coating operation, said cams being arranged to operate their respective parts in timed relation.

2. The combination, in a driving mechanism for cutting and coating machines, of means for cutting individual blocks from a slab of ice cream, work holders each equipped with means for impaling a block, coating means, said work holders being arranged to be moved in succession from a loading position at which the block is impaled, to said coating means for the coating operation and thence to a discharging position, a continuously driven shaft, means operated by said shaft for moving said work holders from one position to another, and cams on said shaft, one for operating said cutting means, another for operating said impaling means, and another for effecting the coating operation, said cams being arranged to effect said operations in timed relation with respect to the movement of the work holders.

3. In a cutting and coating machine, a driving mechanism including a vertical driven shaft, a non-rotatable cam casting positioned on said shaft, radially spaced work holders on said cam casting arranged about said shaft as a center and rotatable thereby between a work receiving and a discharging station, impaling elements at the outer ends of said work holders adapted to be projected and retracted therefrom, cutting mechanism for cutting successive blocks of ice cream and positioning them at said work receiving station, cam slides on said shaft arranged to directly actuate said impaling elements and said cutting mechanism, and cams on said shaft arranged to move said slides in timed relation with the rotation of said work holders.

4. In a cutting and coating machine for ice cream bars, a driving mechanism including a driven shaft, work holders rotatable about said shaft, having impaling elements at their outer ends adapted to be projected and retracted from said holders, a plurality of slides upon said shaft, and cams on said shaft adapted to actuate said slides to move said impaling elements in projecting and retracting movements.

5. In a cutting and coating machine, a driving mechanism including a vertical driven shaft, a non-rotatable cam casting positioned on said shaft, radially spaced work holders on said cam casting rotatable with said shaft between a work receiving and discharging station, having impaling elements at their outer ends adapted to be projected and retracted from said holders, horizontal slides on said shaft arranged to project said impaling elements at said loading station and retract said elements at said discharge station, and cams on said shaft adapted to actuate said slides in timed relation with the rotation of said work holders.

6. The combination, in a driving mechanism for cutting and coating machines, of cutting and feeding mechanism arranged to cut and feed a block of ice cream, radially spaced work holders, impaling elements on said work holders adapted to successively and progressively move said blocks from a loading position to a coating position and from a coating position to a discharging position, with a driven shaft, a cam on said shaft to engage said work holders intermediate the ends thereof and impart vertical movement thereto, and a plurality of cams positioned on said shaft adapted to be operated thereby to intermittently and in timed relation rotate said work holders, actuate said cutting and feeding mechanism, and actuate said impaling elements.

7. The combination in a driving mechanism for cutting and coating machines, of means for cutting individual blocks from a slab of ice cream, work holders each equipped with means for impaling a block, coating means, said work holders being arranged to be moved in succession from a loading position at which the block is impaled, to said coating means for the coating operation, and thence to a discharging position, a vertical continuously driven shaft, a base arranged to receive the lower end of said shaft, a cam casting positioned thereabove in spaced relation arranged to receive the upper end of said shaft and having cam surfaces to be engaged by said work holders, means on said shaft for actuating the operative mechanism thereof, and a plurality of spacing rods connecting said base and said cam casting to support the latter upon the former and lend the structure rigidity.

8. The combination in a driving mechanism for cutting and coating machines having mechanism for cutting individual blocks from a slab of ice cream, of a horizontal cam casting, a horizontal base spaced therefrom, a continuously driven vertical shaft extending between said cam casting and said base, a head rotatably positioned in juxtaposition to said cam casting, a plurality of spaced work holders radially positioned on said head each having means for impaling a block and holding it while it is being coated, means on said shaft for rotating said head to move said work holders from station to station, means on said shaft for actuating said impaling means, and means on said shaft for actuating cutting mechanism, said means being arranged to actuate said work holders, impaling elements and cutting mechanism in timed relation.

9. The combination in a driving mechanism for cutting and coating machines having mechanism for cutting individual blocks from a slab of ice cream, work holders adapted to transport blocks from a loading position to a coating position and thence to a discharging position, a continuously driven vertical shaft, and means on said shaft for actuating said mechanism and said work holders in timed relation, of a cam casting arranged to support said work holders and support the upper end of said shaft, a base arranged to support the lower end of said shaft, and a plurality of spacing rods connecting said cam casting and said base to secure the latter in spaced relation and provide a rigid structure.

10. The combination in a driving mechanism for cutting and coating machines having cutting mechanism for cutting individual blocks from a slab of ice cream, of a work head having radially spaced slots therein, work holders secured in said slots each having impaling elements at its outer end adapted to be retracted or projected therefrom to impale a block, said work holders being arranged to be moved from a loading position to a coating position and thence to a discharging position by rotation of said head, a continuously driven vertical shaft, a horizontal base below said shaft, a cam casting spaced from said base arranged to rotatably support said work head and guide said work holders, and means on said shaft for moving said work head and for actuating said cutting mechanism and said impaling elements in timed relation.

11. A machine as set forth in claim 10 wherein said last mentioned means includes a cam upon said shaft operable to actuate said impaling elements in retracting movement and to impart intermittent rotation to said work head in timed relation.

12. A machine as set forth in claim 10 wherein said last mentioned means includes a ratchet gear fixed to said work head, a cam fixed to said shaft, a cam slide interposed therebetween, and a pawl positioned upon said cam slide, said cam being arranged to move said cam slide outward to retract said impaling elements and draw said cam slide inward whereby said pawl engages said ratchet wheel, to rotate said work head through a predetermined angularity.

13. A machine as set forth in claim 10 wherein said last mentioned means includes a pair of cams and a cam slide therebetween, arranged to actuate said impaling elements in projecting movement, one of said cams moving said slide in rapid impaling movement and the other cam moving the slide in rapid approach movement.

14. A machine as set forth in claim 10 wherein said last mentioned means includes a pair of cams and a cam slide therebetween arranged to actuate said cutting mechanism in timed relation.

In witness of the foregoing I affix my signature.

FRED L. BORCHERT.